United States Patent
Gad et al.

(10) Patent No.: US 12,513,625 B2
(45) Date of Patent: Dec. 30, 2025

(54) OVERSHOOTING MITIGATION IN OPEN RADIO ACCESS NETWORK

(71) Applicant: Dell Products L.P., Round Rock, TX (US)

(72) Inventors: Omar Gad, London (GB); Medhat Khalifa, Giza (EG); Marwan Mansour, Alexandria (EG); Mohamed Abouzeid, Sheikh Zayed (EG)

(73) Assignee: DELL PRODUCTS L.P., Round Rock, TX (US)

( * ) Notice: Subject to any disclaimer, the term of this patent is extended or adjusted under 35 U.S.C. 154(b) by 312 days.

(21) Appl. No.: 18/339,479

(22) Filed: Jun. 22, 2023

(65) Prior Publication Data

US 2024/0430814 A1    Dec. 26, 2024

(51) Int. Cl.
*H04W 52/24* (2009.01)
*H04W 24/02* (2009.01)

(52) U.S. Cl.
CPC ......... *H04W 52/241* (2013.01); *H04W 24/02* (2013.01)

(58) Field of Classification Search
CPC .... H04W 52/241; H04W 24/02; H04W 16/18
See application file for complete search history.

(56) References Cited

U.S. PATENT DOCUMENTS

2016/0165472 A1* 6/2016 Gopalakrishnan .... H04W 24/10
    455/67.11
2018/0160345 A1* 6/2018 Levinkron .............. H04L 41/16

FOREIGN PATENT DOCUMENTS

WO    2008/014818 A1    2/2008

OTHER PUBLICATIONS

International Search Report and Written Opinion received for PCT Application Serial No. PCT/US2023/036199 dated Feb. 23, 2024, 14 pages.

\* cited by examiner

*Primary Examiner* — Zhitong Chen
(74) *Attorney, Agent, or Firm* — Amin, Turocy & Watson, LLP

(57) ABSTRACT

Overshooting mitigation in an open radio access network (e.g., using a computerized tool), is enabled. For example, a system can comprise a processor and a memory that stores executable instructions that, when executed by the processor, facilitate performance of operations, comprising, based on source cell data applicable to a source cell and based on neighbor cell data applicable to a neighbor cell, determining, using an overshooting classifier model, whether overshooting from the source cell to the neighbor cell has occurred, in response to determining that the overshooting has occurred, determining, using a distance recommendation model, a recommended cellular transmission distance applicable to the source cell, and based on the recommended cellular transmission distance, causing an overshooting mitigation action to be performed that has been determined to conform a cellular transmission distance, applicable to the source cell, to the recommended cellular transmission distance.

20 Claims, 14 Drawing Sheets

OVERSHOOTING MITIGATION IN OPEN RADIO ACCESS NETWORK

BACKGROUND

Overshooting is the occurrence of a cellular signal or function exceeding its target. Overshooting is a common problem in telecommunications networks, and causes interference and degraded performance in a corresponding radio access network (RAN), for instance, when adding or removing cellular sites. Overshooting leads to handover issues for user equipment (UE), quality of service (QOS) and throughput degradation, increased block error rate (BLER) and drops on at a victim cell, impacted physical cell identifier (PCI) planning and initial access, and increased power consumption and reduced energy efficiency. Currently, recalibration of cellular sites is performed manually, and is prone to human error as overshooting calculations are difficult and requires technicians to physically visit sites, which is costly and time consuming.

The above-described background relating to telecommunications systems is merely intended to provide a contextual overview of some current issues and is not intended to be exhaustive. Other contextual information may become further apparent upon review of the following detailed description.

DETAILED DESCRIPTION

Figure 1:
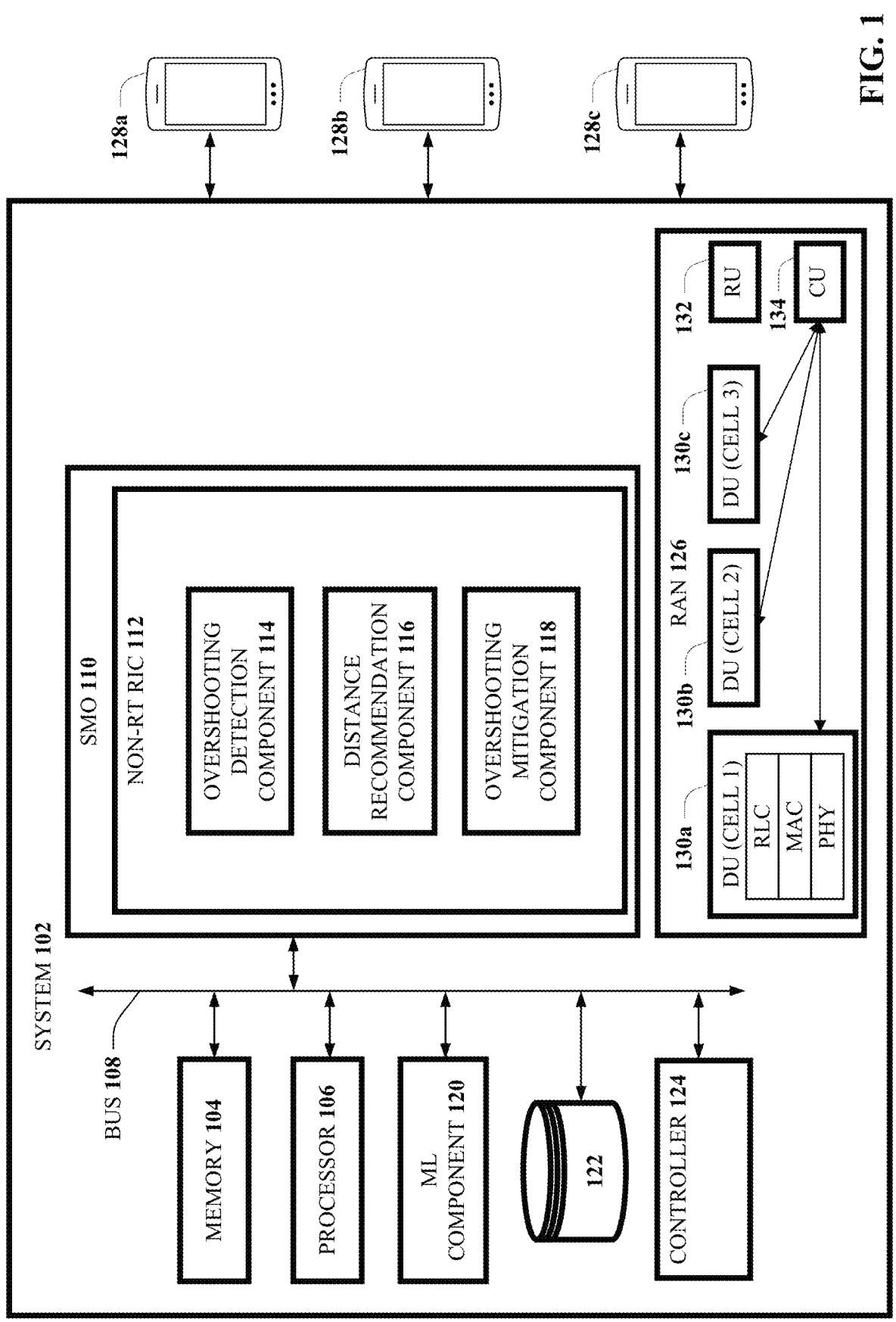
FIG. 1 is a block diagram of an exemplary system in accordance with one or more embodiments described herein.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

As alluded to above, overshooting mitigation can be improved in various ways, and various embodiments are described herein to this end and/or other ends. The disclosed subject matter relates to telecommunications systems and, more particularly, to overshooting mitigation in an open radio access network.

According to an embodiment, a system can comprise a processor, and a memory that stores executable instructions that, when executed by the processor, facilitate performance of operations, comprising, based on source cell data applicable to a source cell and based on neighbor cell data applicable to a neighbor cell, determining, using an overshooting classifier model, whether overshooting from the source cell to the neighbor cell has occurred, in response to determining that the overshooting has occurred, determining, using a distance recommendation model, a recommended cellular transmission distance applicable to the source cell, and based on the recommended cellular transmission distance, causing an overshooting mitigation action to be performed that has been determined to conform a cellular transmission distance, applicable to the source cell, to the recommended cellular transmission distance.

In one or more embodiments, the overshooting classifier model can be generated using machine learning based on past overshooting between other cells, other than the source cell and the neighbor cell. In further embodiments, the distance recommendation model can be generated using machine learning based on past distances of other cellular transmissions of other cells, other than the source cell.

In one or more embodiments, the overshooting mitigation action can comprise a change in transmission power applicable to the source cell. In further embodiments, the overshooting mitigation action can comprise a change in a tilt of an antenna applicable to the source cell.

In one or more embodiments, the source cell data or the neighbor cell data can comprise time advance data, geographical location data, azimuth data, antenna height data, transmission power data, radio frequency data, antenna tilt data, antenna gain data, or terrain type data applicable to the source cell or to the neighbor cell.

In one or more embodiments, the neighbor cell can comprise a first neighbor cell, and the recommended cellular transmission distance can be based on overshooting of the source cell to the first neighbor cell and overshooting of the source cell to a second neighbor cell, other than the first neighbor cell.

In one or more embodiments, the overshooting mitigation action can be determined using an overshooting mitigation model. In this regard, the overshooting mitigation model can be generated using machine learning based on past overshooting mitigation actions, other than the overshooting mitigation action.

In one or more embodiments, the above operations can further comprise, in response to causing the overshooting mitigation action, determining, using the overshooting classifier model, whether the overshooting from the source cell to the neighbor cell has stopped occurring. In this regard, the above operations can further comprise, in response to a result of the determining whether the overshooting has stopped occurring indicating that the overshooting from the source cell to the neighbor cell has not stopped occurring, determining, using the distance recommendation model, a revised recommended cellular transmission distance applicable to the source cell, and based on the revised recommended cellular transmission distance, causing a revised overshooting mitigation action to be performed that has been determined to conform the cellular transmission distance to the revised recommended cellular transmission distance.

In another embodiment, a non-transitory machine-readable medium can comprise executable instructions that, when executed by a processor, facilitate performance of operations, comprising, based on source network equipment data applicable to source network equipment and based on neighbor network equipment data applicable to neighbor network equipment, determining, using an overshooting classifier model, that overshooting from the source network equipment to the neighbor network equipment has occurred, in response to the determining that the overshooting has occurred, determining, using a distance recommendation model, a recommended cellular transmission distance applicable to the source network equipment, and based on the recommended cellular transmission distance, initiating an action to mitigate the overshooting, the action having been determined to conform a cellular transmission distance, applicable to the source network equipment, to the recommended cellular transmission distance.

In one or more embodiments, the overshooting classifier model can be generated using machine learning based on past overshooting between other network equipment, other than the source network equipment and the neighbor network equipment. In further embodiments, the distance recommendation model can be generated using machine learning based on past distances of other cellular transmissions of other network equipment, other than the source network equipment.

In one or more embodiments, the action can comprise a change in transmission power applicable to the source network equipment. In further embodiments, the action can comprise a change in a tilt of an antenna applicable to the source network equipment.

According to yet another embodiment, a method can comprise, based on first cell data applicable to a first cell and based on second cell data applicable to a second cell, determining, by network equipment comprising a processor, using an overshooting classifier model, whether overshooting from the first cell to the second cell has occurred, in response to the overshooting being determined to have occurred, determining, by the network equipment, using a distance recommendation model, recommended distance data representative of a recommended cellular transmission distance applicable to the first cell, and based on the recommended distance data, facilitating, by the network equipment, an overshooting mitigation action determined to conform a cellular transmission distance, applicable to the first cell, to the recommended cellular transmission distance.

In one or more embodiments, the first cell data or the second cell data can comprise time advance data, geographical location data, azimuth data, antenna height data, transmission power data, radio frequency data, antenna tilt data, antenna gain data, or terrain type data applicable to the first cell or to the second cell.

In one or more embodiments, the recommended cellular transmission distance can be based on a first overshooting of the first cell to the second cell and a second overshooting of the first cell to a third cell, other than the first cell and the second cell.

In one or more embodiments, the overshooting mitigation action can be determined using an overshooting mitigation model. In this regard, the overshooting mitigation model can be generated using machine learning based on past overshooting mitigation actions, other than the overshooting mitigation action.

In one or more embodiments, the above method can further comprise, in response to facilitating the overshooting mitigation action, determining, by the network equipment, using the overshooting classifier model, whether the overshooting from the first cell to the second cell has stopped occurring, in response to a determination that the overshooting from the first cell to the second cell has not stopped occurring, determining, by the network equipment, using the distance recommendation model, revised recommended distance data representative of a revised recommended cellular transmission distance applicable to the first cell, and based on the revised recommended distance data, facilitating, by the network equipment, a revised overshooting mitigation action determined to conform the cellular transmission distance to the revised recommended cellular transmission distance.

It should be appreciated that additional manifestations, configurations, implementations, protocols, etc. can be utilized in connection with the following components described herein or different/additional components as would be appreciated by one skilled in the art.

Embodiments herein enable mitigation of overshooting, for instance, by detecting overshooting (e.g., via a machine learning (ML) model), recommending a corresponding coverage distance, and/or facilitating an action determined to mitigate the overshooting.

To detect overshooting, embodiments herein enable identification of recommended coverage distances for each cell in a RAN, for instance, by utilizing an ML model and corresponding inputs comprising geographical locations of all cells. By utilizing time advance provided to a non-real time (RT) radio access network intelligent controller (RIC) and/or service management and orchestration (SMO), the ML model can be utilized to identify actual distance vs. recommended distance applicable to a given cell. If the recommended distance is exceeded by the actual distance, a system herein can identify the corresponding cell as an overshooting cell (e.g., a source cell). Corresponding overshooting mitigation, as enabled herein, can comprise one or more of (1) changing an electric tilt of an antenna of the source cell, and/or (2) decreasing transmit power of the antenna of the source cell.

Embodiments herein can utilize machine learning (ML)-based rApps (e.g., as computer executable components) to identify overshooting, determine recommended distance(s), and/or apply corresponding overshooting mitigation action(s) determined to mitigate the overshooting by a source cell.

Turning now to FIG. 1, there is illustrated an example, non-limiting system 102 in accordance with one or more embodiments herein. System 102 can comprise a computerized tool, which can be configured to perform various operations relating to overshooting mitigation in an open radio access network (ORAN). The system 102 can comprise one or more of a variety of components, such as memory 104, processor 106, bus 108, SMO 110, non-RT RIC 112, overshooting detection component 114, distance recommendation component 116, overshooting mitigation component 118, ML component 120, model(s) 122, controller 124 (e.g., a near-RT RIC), radio access network (RAN) 126 (e.g., an E2 node), distributed units (DUs) 130, radio unit (RU) 132, and central unit (CU) 134. In various embodiments, the system 102 can be communicatively coupled to, or can further comprise, one or more user equipment (UE) 128. In various embodiments, one or more of the memory 104, processor 106, bus 108, SMO 110, non-RT RIC 112, overshooting detection component 114, distance recommendation component 116, overshooting mitigation component 118, ML component 120, model(s) 122, controller 124, RAN 126 (e.g., an E2 node), one or more of UE 128, one or more of DU 130, RU 132, and/or CU 134 can be communicatively or operably coupled (e.g., over a bus or wireless network) to one another to perform one or more functions of the system 102.

In various embodiments, the SMO 110 can comprise a service management and orchestration layer that controls, for instance, configuration and automation aspects of RIC and/or RAN 126 elements. In this regard, the SMO 110 can onboard xApps and/or rApps onto RIC components. In various embodiments, the non-RT RIC 112 can comprise an intelligent controller that hosts ML models (e.g., model(s) 122), and has access to data coming from the RAN 126 to validate and/or train such model(s) 122. In various embodiments, the controller 124 can comprise a near-RT RIC.

According to an embodiment, the overshooting detection component 114 can, based on source cell data applicable to a source cell (e.g., source cell 202) and based on neighbor cell data applicable to a neighbor cell (e.g., neighbor cell 208), determine (e.g., using an overshooting classifier model), whether overshooting from the source cell (e.g., source cell 202) to the neighbor cell (e.g., neighbor cell 208) has occurred. It is noted that the overshooting detection component 114 can comprise and/or utilize an ML model (e.g., of the model(s) 122) that takes RAN 126 and/or cell configuration data as an input, for instance, to detect if overshooting (e.g., by the source cell 202) is occurring. The overshooting detection component 114 utilizes, for instance, as inputs to detect overshooting, key performance indicators (KPIs) from one or more cells in a network to determine whether a cell in the network impacted by overshooting. In various embodiments, the source cell data or the neighbor cell data can comprise one or more KPIs, such as time advance data, geographical location data, azimuth data, antenna height data, transmission power data, radio frequency data, antenna tilt data, antenna gain data, or terrain type data applicable to the source cell (e.g., source cell 202) or to the neighbor cell (e.g., neighbor cell 208).

Figure 3:
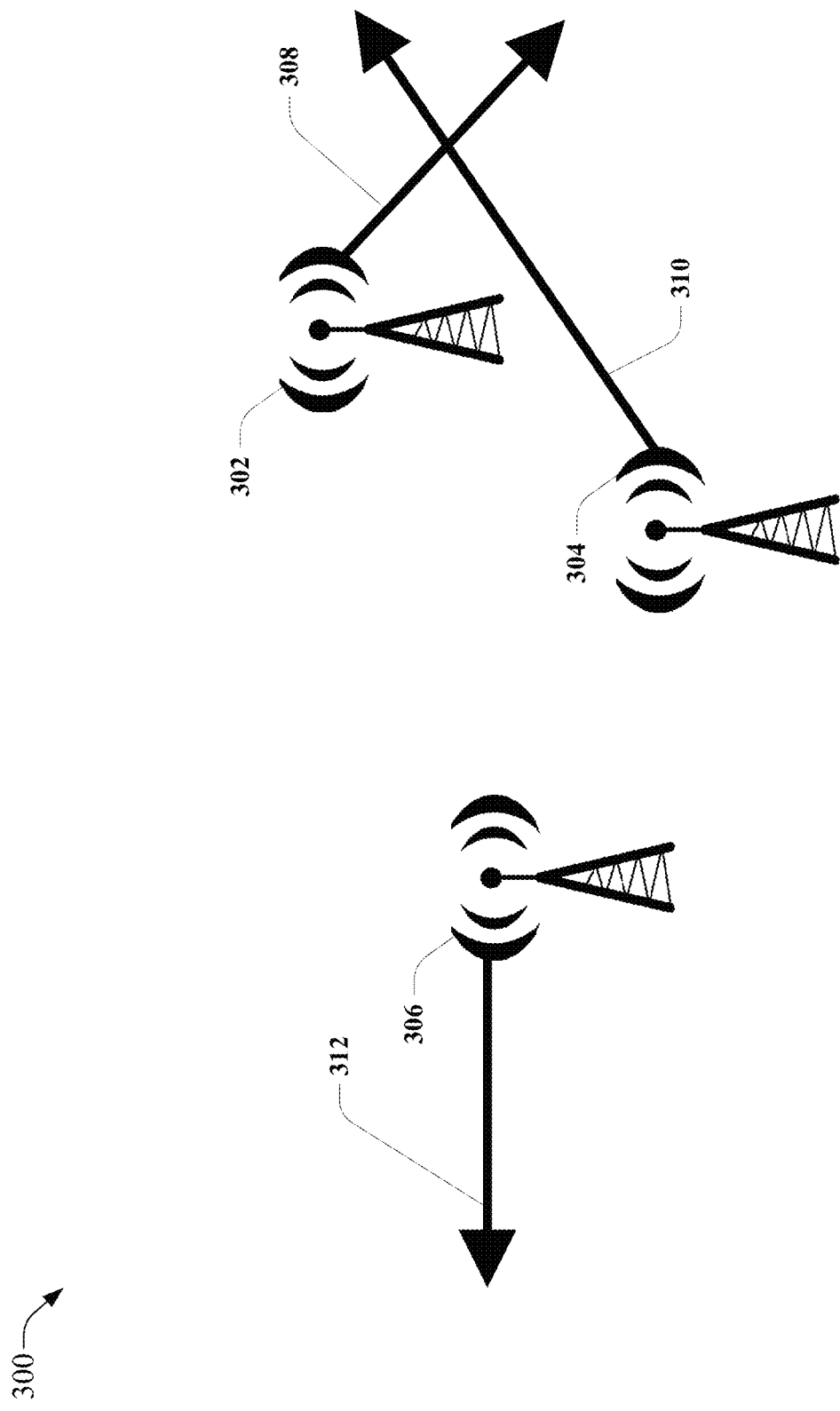
FIG. 3 is a diagram of exemplary overshooting detection in accordance with one or more embodiments described herein.

In various embodiments, the overshooting detection component 114 can comprise an rApp on the non-RT RIC 112. In various embodiments, the overshooting detection component 114 can utilize a supervised classifier that can detect overshooting between a specific cell (e.g., source cell 202) and its neighboring cells (e.g., neighbor cell 208 or neighbor cell 212). In one or more embodiments, the overshooting detection component 114 can check intersection between cells using azimuth, for instance, to avoid cells in different azimuth, as illustrated in FIG. 3, in which cell 302 and cell 304 are propagating at the same direction, however, cell 306 is propagating in another direction, so cell 306 would not be considered (e.g., by the overshooting mitigation component 118) for overshooting mitigation.

In various embodiments, the overshooting detection component 114 can utilize a supervised ML model (e.g., of the model(s) 122) to classify overshooting between two cells (e.g., a source cell 202 and a neighbor cell 208). It is noted that such an ML model can output a one hot encoded list resembling the occurrence of overshooting between a specific cell and any of its neighbors. The ML model can utilize source cell and neighboring cell information (e.g., KPIs), such as time advance, geographical location, azimuth, antenna height, transmission power, radio frequency (RF), antenna tilt, antenna gain, terrain type, and/or other suitable factors/attributes. Such attributes can provide location information and cell configurations. Therefore, the ML model can learn overshooting patterns between cells and in turn accurately detect the cells (e.g., neighbor cells) on which a given cell (e.g., source cell) is overshooting.

In various embodiments, the overshooting detection component 114 can be triggered when an SMO node configuration change is made (e.g., a configuration change is made for an arbitrary cell). The overshooting detection component 114 can retrieve the changed cell information, and the information of neighboring cell (e.g., within a defined radius of the changed cell). It is noted that the defined radius can be configurable. The collected information can be passed (e.g., via the overshooting detection component 114) as input to the ML model (e.g., of the model(s) 122) as a two-dimensional array, in which the first row represents the source cell and the second row represents the neighbor cell's features (see FIG. 4). The ML model's output for all the input instances can be concatenated (e.g., via the overshooting detection component 114) to represent the cells that are impacted by overshooting by the recently reconfigured cell (e.g., source cell 202). The neighboring cells, which are impacted by overshooting and the source cell (e.g., source cell 202), can be passed (e.g., via the overshooting detection component 114) to the distance recommendation component 116, for instance, to predict the suitable transmit distance of the cell in question (e.g., source cell 202).

According to an embodiment, the distance recommendation component 116 can, in response to a determination (e.g., via the overshooting detection component 114) that overshooting has occurred, determine, using a distance recommendation model (e.g., of the model(s) 122), a recommended cellular transmission distance applicable to the source cell (e.g., source cell 202). It is noted that the distance recommendation component 116 can comprise and/or utilize an ML model (e.g., of the model(s) 122) that takes RAN 126 and/or cell configuration data an input to predict the recommended propagation distance for a given cell (e.g., source cell 202).

In various embodiments, the distance recommendation component 116 can utilize a regression model (e.g., of the model(s) 122) that takes as input the distances between the overshooting site(s) and information regarding the sites. This model can be utilized (e.g., via the distance recommendation component 116) to predict the recommended distance to avoid such overshooting. Quantities of input to the model can vary, for instance, based on the number of victim sites (e.g., neighbor cells) (e.g., in some embodiments, the distance recommendation component 116 can pad the input with zeros).

According to an embodiment, the overshooting mitigation component 118 can, based on the recommended cellular transmission distance (e.g., from the distance recommendation component 116), cause an overshooting mitigation action to be performed that has been determined (e.g., by the overshooting mitigation component 118) to conform a cellular transmission distance, applicable to the source cell (e.g., source cell 202), to the recommended cellular transmission distance (e.g., from the distance recommendation component 116). It is noted that the overshooting mitigation component 118 can recalibrate cell sites to ensure that no overshooting occurs. In various embodiments, the overshooting mitigation action can comprise a change in transmission power applicable to the source cell (e.g., an antenna of the source cell 202). In further embodiments, the overshooting mitigation action can comprise a change in a tilt of an antenna applicable to the source cell (e.g., source cell 202).

In various embodiments, overshooting mitigation component 118 can comprise an rApp on the non-RT RIC 112. The overshooting mitigation component 118 can take, as an input, the recommended distance (e.g., from the distance recommendation component 116) to avoid overshoot (e.g., by the source cell 202). The overshooting mitigation component 118 can further identify an action that should be taken so that the source cell 202 can abide by the recommended distance (e.g., from the distance recommendation component 116) and thus mitigate overshooting by the source cell 202. The overshooting mitigation component 118 can utilize a rule based model (e.g., of the model(s) 122) which follows a defined equation to identify the best action. Pathloss can be calculated (e.g., via the overshooting detection component 114), for instance, according to the current overshooting cell configuration (e.g., operating frequency, current transmitted power, and/or antenna gain applicable to the source cell 202). In various embodiments, the distance recommendation component 116 and/or overshooting mitigation component 118 can facilitate an iteration action, for instance, based on overshooting detection component 114 feedback. To minimize such iteration, the system 102 can utilize an Okumura-Hata model to predict propagation pathloss for recommended distance. For example:

$$PL(dB) = 69.55 + 26.16\log 10(f) - 13.82\log 10(hte) - a(hte) + (44.9 - 6.55\log 10(hte))\log 10(d)$$

in which:
PL=Path loss (dB)
f=Frequency (MHz)
hte=antenna height (m)
d=recommend distance (km)
a=coefficient that depends on the environment.

In various embodiments, the overshooting classifier model (e.g., ML model classifier 406 of the model(s) 122) can be generated (e.g., via the ML component 120) using machine learning based on past overshooting between other cells, other than the source cell (e.g., source cell 202) and the neighbor cell (e.g., neighbor cell 208). In various embodiments, the distance recommendation model (e.g., distance recommendation model 502 of the model(s) 122) can be generated (e.g., via the ML component 120) using machine learning based on past distances of other cellular transmissions of other cells, other than the source cell (e.g., source cell 202).

In various embodiments, the overshooting mitigation action can be determined (e.g., via the overshooting mitigation component 118) using an overshooting mitigation model (e.g., of the model(s) 122). In this regard, the overshooting mitigation model (e.g., of the model(s) 122) can be generated (e.g., via the ML component 120) using machine learning based on past overshooting mitigation actions, other than the instant overshooting mitigation action.

In various embodiments, the overshooting detection component 114 can, in response to the overshooting mitigation action being facilitated by the overshooting mitigation component 118, determine, using the overshooting classifier model (e.g., ML model classifier 406 of the model(s) 122), whether the overshooting from the source cell (e.g., source cell 202) to the neighbor cell (e.g., neighbor cell 208) has stopped occurring. In this regard, the distance recommendation component 116 can, in response to a result of the determining (e.g., via the overshooting detection component 114) whether the overshooting has stopped occurring indicating that the overshooting from the source cell (e.g., source cell 202) to the neighbor cell (e.g., neighbor cell 208) has not stopped occurring, determine, using the distance recommendation model (e.g., of the model(s) 122), a revised recommended cellular transmission distance applicable to the source cell (e.g., source cell 202). Further in this regard, the overshooting mitigation component 118 can, based on the revised recommended cellular transmission distance, cause a revised overshooting mitigation action to be performed that has been determined (e.g., via the overshooting mitigation component 118) to conform the cellular transmission distance (e.g., by the source cell 202) to the revised recommended cellular transmission distance.

In various embodiments, the neighbor cell (e.g., neighbor cell 208) can comprise a first neighbor cell, and the recommended cellular transmission distance can be based on overshooting of the source cell to the first neighbor cell and overshooting of the source cell to a second neighbor cell (e.g., neighbor cell 212), other than the first neighbor cell (e.g., neighbor cell 208).

Various embodiments herein can employ artificial-intelligence or machine learning systems and techniques to facilitate learning user behavior, context-based scenarios, preferences, etc. in order to facilitate taking automated action with high degrees of confidence. Utility-based analysis can be utilized to factor benefit of taking an action against cost of taking an incorrect action. Probabilistic or statistical-based analyses can be employed in connection with the foregoing and/or the following.

It is noted that systems and/or associated controllers, servers, or machine learning components herein can comprise artificial intelligence component(s) which can employ an artificial intelligence (A.I.) model and/or M.L. or an M.L. model that can learn to perform the above or below described functions (e.g., via training using historical training data and/or feedback data).

In some embodiments, ML component 120 can comprise an A.I. and/or M.L. model that can be trained (e.g., via supervised and/or unsupervised techniques) to perform the above or below-described functions using historical training data comprising various context conditions that correspond to various augmented network optimization operations. In this example, such an A.I. and/or M.L. model can further learn (e.g., via supervised and/or unsupervised techniques) to perform the above or below-described functions using training data comprising feedback data, where such feedback data can be collected and/or stored (e.g., in memory) by the ML component 120. In this example, such feedback data can comprise the various instructions described above/below that can be input, for instance, to a system herein, over time in response to observed/stored context-based information.

A.I./M.L. components herein can initiate an operation(s) associated with a based on a defined level of confidence determined using information (e.g., feedback data). For example, based on learning to perform such functions described above using feedback data, performance information, and/or past performance information herein, a ML component 120 herein can initiate an operation associated with determining various thresholds herein (e.g., a motion pattern thresholds, input pattern thresholds, similarity thresholds, authentication signal thresholds, audio frequency thresholds, or other suitable thresholds).

In an embodiment, the ML component 120 can perform a utility-based analysis that factors cost of initiating the above-described operations versus benefit. In this embodiment, the ML component 120 can use one or more additional context conditions to determine various thresholds herein.

To facilitate the above-described functions, a ML component 120 herein can perform classifications, correlations, inferences, and/or expressions associated with principles of artificial intelligence. For instance, the ML component 120 can employ an automatic classification system and/or an automatic classification. In one example, the ML component 120 can employ a probabilistic and/or statistical-based analysis (e.g., factoring into the analysis utilities and costs) to learn and/or generate inferences. The ML component 120 can employ any suitable machine-learning based techniques, statistical-based techniques and/or probabilistic-based techniques. For example, the ML component 120 can employ expert systems, fuzzy logic, support vector machines (SVMs), Hidden Markov Models (HMMs), greedy search algorithms, rule-based systems, Bayesian models (e.g., Bayesian networks), neural networks, other non-linear training techniques, data fusion, utility-based analytical systems, systems employing Bayesian models, and/or the like. In another example, the ML component 120 can perform a set of machine-learning computations. For instance, the ML component 120 can perform a set of clustering machine learning computations, a set of logistic regression machine learning computations, a set of decision tree machine learning computations, a set of random forest machine learning computations, a set of regression tree machine learning computations, a set of least square machine learning computations, a set of instance-based machine learning computations, a set of regression machine learning computations, a set of support vector regression machine learning computations, a set of k-means machine learning computations, a set of spectral clustering machine learning computations, a set of rule learning machine learning computations, a set of Bayesian machine learning computations, a set of deep Boltzmann machine computations, a set of deep belief network computations, and/or a set of different machine learning computations.

Figure 2:
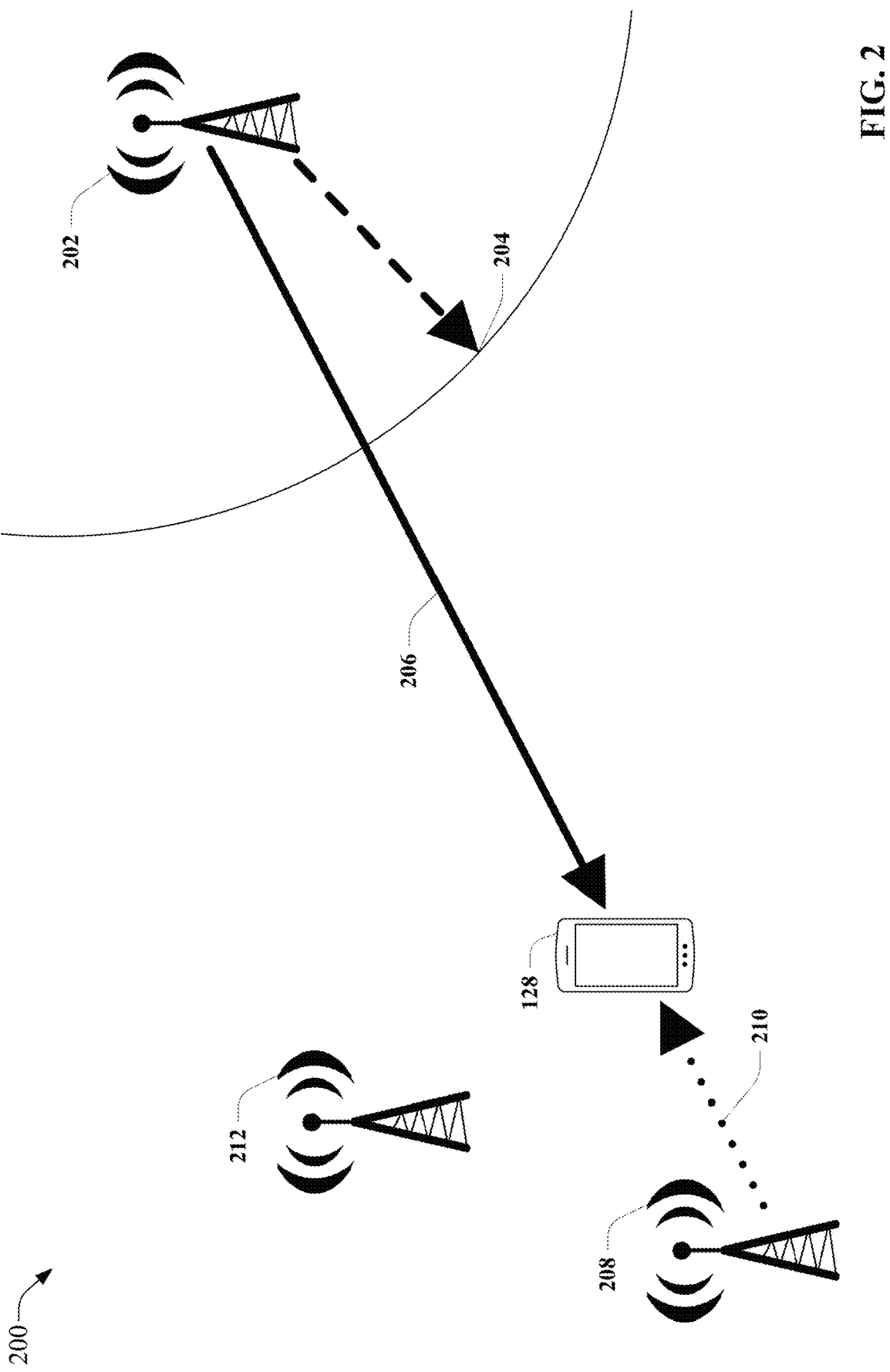
FIG. 2 is a diagram of exemplary overshooting in accordance with one or more embodiments described herein.

Turning now to FIG. 2, there is illustrated a diagram 200 of exemplary overshooting in accordance with one or more embodiments described herein. Diagram 200 can comprise a source cell 202 (e.g., an aggressor cell) and a neighbor cell 208 (e.g., a victim cell). Service to the UE 128 can be diminished due to overshooting by the source cell 202. The source cell 202 can comprise a recommended signal distance 204, however, can be broadcasting an overshooting signal 206 that exceeds the recommended signal distance 204, reaching the UE 128. Service to the UE 128, that should be provided by the signal 210 from the neighbor cell 208, can be interrupted by the overshooting signal 206 from the source cell 202. In some embodiments, the neighbor cell 208 can comprise a first neighbor cell (e.g., a first victim cell). In this regard, the neighbor cell 212 can comprise a second neighbor cell (e.g., a second victim cell).

FIG. 3 illustrates a diagram 300 of exemplary overshooting detection in accordance with one or more embodiments described herein. In diagram 300, the overshooting detection component 114 can check (e.g., one or more sensors of the system 102) for intersection between signal 308 of cell 302 and signal 310 of cell 304, for instance, using azimuth (e.g., angle of propagation/transmission) to avoid cells in different azimuth. In diagram 300, signal 308 of cell 302 and signal 310 of cell 304 propagate in the same direction, however, signal 312 of cell 306 propagates in another direction, so cell 306 would not be considered, by the overshooting detection component 114, for overshooting mitigation by the overshooting mitigation component 118.

Figure 4:
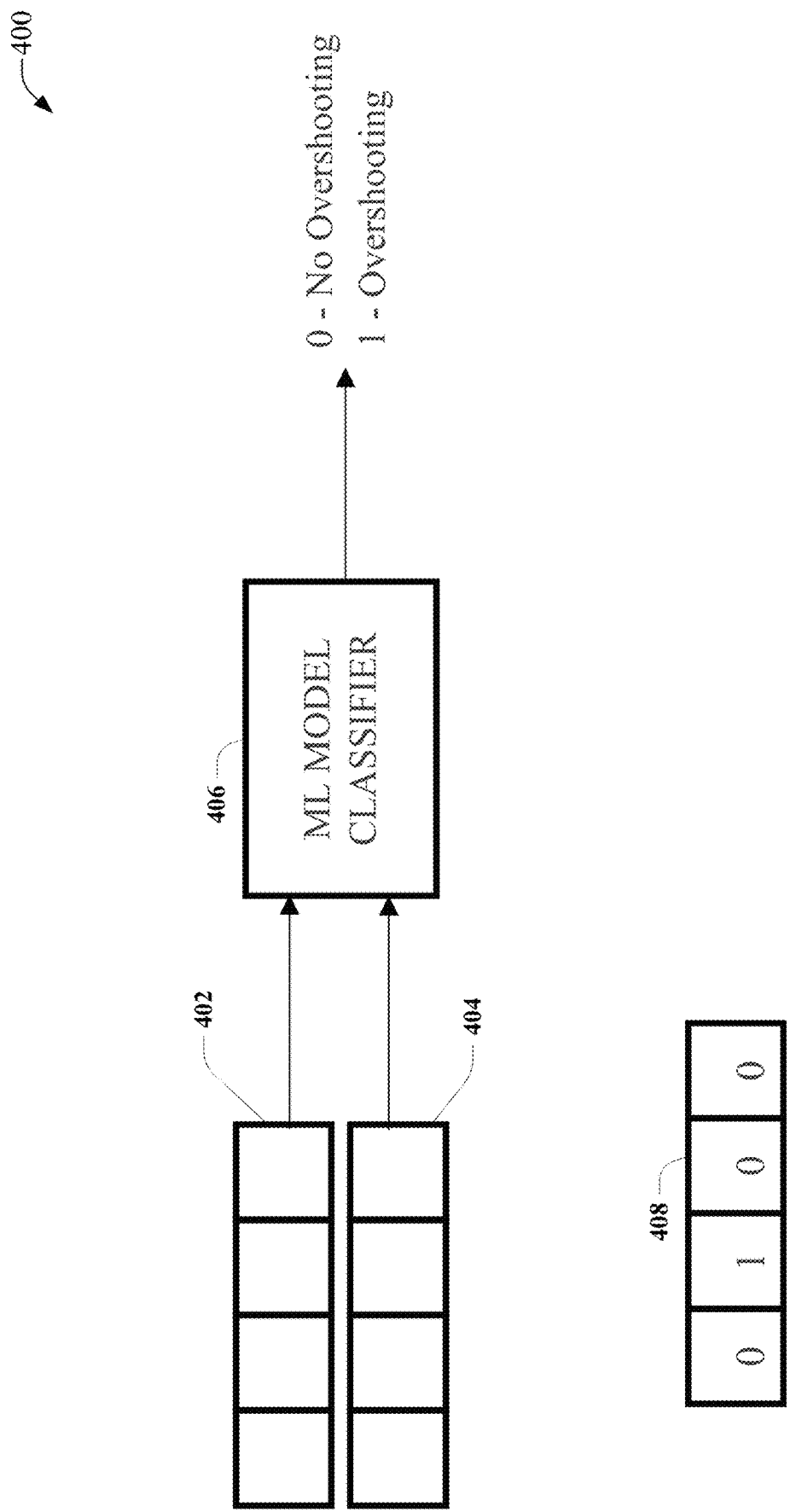
FIG. 4 is a diagram of exemplary overshooting detection in accordance with one or more embodiments described herein.

FIG. 4 illustrates a diagram 400 of exemplary overshooting detection in accordance with one or more embodiments described herein. The model inference (e.g., via the ML model classifier 406) can be run in a batch for all retrieved neighboring cells within a defined/specified range (e.g., of a source cell). The model outputs can be concatenated (e.g., via the overshooting detection component 114) to represent the impacted neighboring cells. Source cell information 402 and neighbor cell information 404 can comprise inputs into the ML model classifier 406. An exemplary one-hot encoding 408 is depicted, for instance, for overshooting predictions on neighboring cells.

Figure 5:
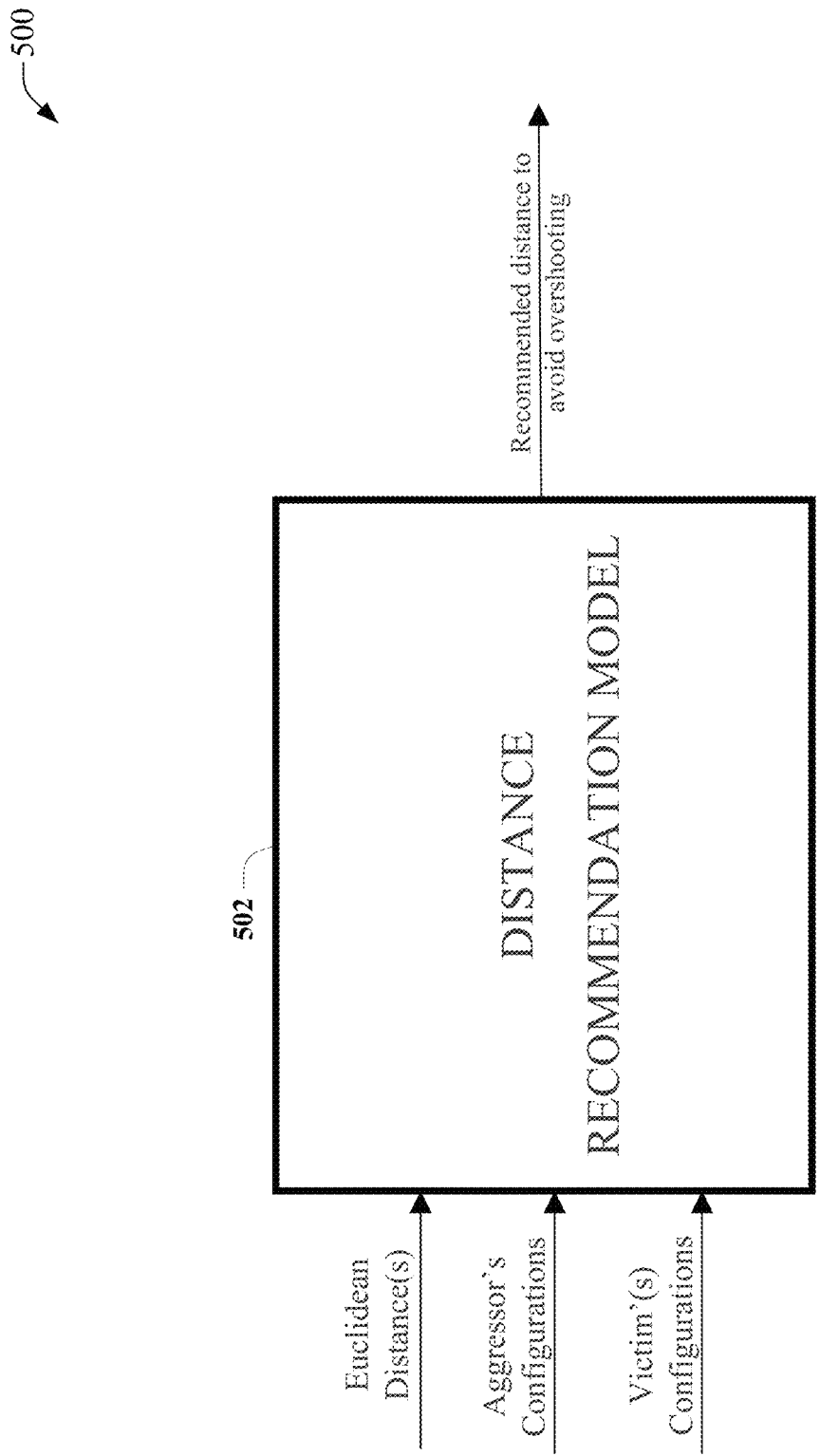
FIG. 5 is a diagram of exemplary distance recommendation in accordance with one or more embodiments described herein.

FIG. 5 illustrates a diagram 500 of exemplary distance recommendation in accordance with one or more embodiments described herein. The distance recommendation model 502 (e.g., of the model(s) 122) can comprise a regression ML model that takes, as an input, data covering the settings of the source cell and neighbor cell site(s), and can be utilized (e.g., by the distance recommendation component 116) to recommend the optimal propagating distance, determined not to cause overshooting. Input to this model can comprise one or more of the following:
Euclidean distance(s) between the source cell and neighbor cell(s)
Source cell configurations:
  Power
  Azimuth
  Time advance
  Tilt
  Etc.
Neighbor cell configurations:
  Power
  Azimuth
  Time advance
  Tilt
  Etc.

The size of the input layer to the distance recommendation model 502 can be dynamic, for instance, based on the quantity of neighbor cells within a defined distance of the source cell. In this regard, the smallest input size can comprise one neighbor cell, and the size of the input can be directly proportional to quantity of neighbor cells, neighboring within a defined distance of the source cell. The distance recommendation model 502 can overcome the dynamic input size, for instance, by padding the data locations for the non-existing neighbor cells with zeros. In various embodiments, the distance recommendation model 502 can comprise a supervised regression model that is can be utilized (e.g., via the distance recommendation component 116) to calculate the recommended distance for propagation for the source cell to avoid overshooting. The distance recommendation model 502's performance can be calculated (e.g., via the system 102) by the mean square error between the actual propagation value and the recommended propagation value. The output of the distance recommendation model 502 can comprise a recommended distance for the source cell (e.g., source cell 202) to avoid overshooting other neighbor cells.

Figure 6:
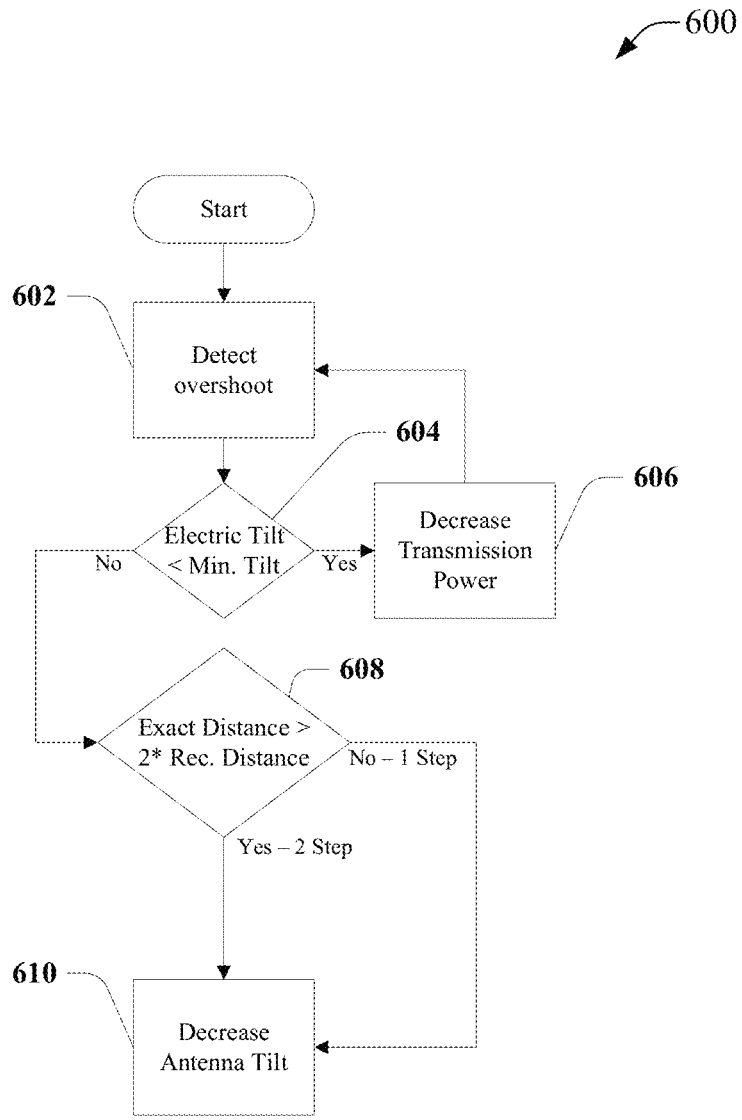
FIG. 6 is a flow chart for a process associated with overshooting mitigation in accordance with one or more embodiments described herein.

FIG. 6 illustrates a flow chart for a process 600 associated with overshooting mitigation in accordance with one or more embodiments described herein. At 602, the overshooting detection component 114 can detect overshooting by a source cell (e.g., source cell 202) described herein. At 604, the overshooting detection component 114 can determine whether an electric tilt (e.g., of an antenna of the source cell 202) is less than a minimum defined tilt of the antenna of the source cell 202. If the electric tilt is determined (e.g., via the overshooting detection component 114) to be less than the minimum tilt, then the process 600 can proceed to 606, at which transmission power of the antenna of the source cell 202 is decreased in order to conform the signal from the antenna of the source cell 202 to a recommended distance (e.g., a recommended distance determined via the distance recommendation component 116). If at 604, the electric tilt is determined (e.g., via the overshooting detection component 114) not to be less than the minimum tilt, then the process can proceed to 608. At 608, the overshooting detection component 114 can determine whether the determined overshoot distance of the source cell is more than two times the recommended signal distance for the source cell 202. If the determined overshoot distance of the source cell is determined (e.g., via the overshooting detection component 114) to be more than two times the recommended signal distance for the source cell 202, then two steps of decrease of antenna tilt of the source cell 202 can be applied at 610 (e.g., via the overshooting mitigation component 118). If the determined overshoot distance of the source cell is determined (e.g., via the overshooting detection component 114) not to be more than two times the recommended signal distance for the source cell 202, then one step of decrease of antenna tilt of the source cell 202 can be applied at 610 (e.g., via the overshooting mitigation component 118).

Figure 7:
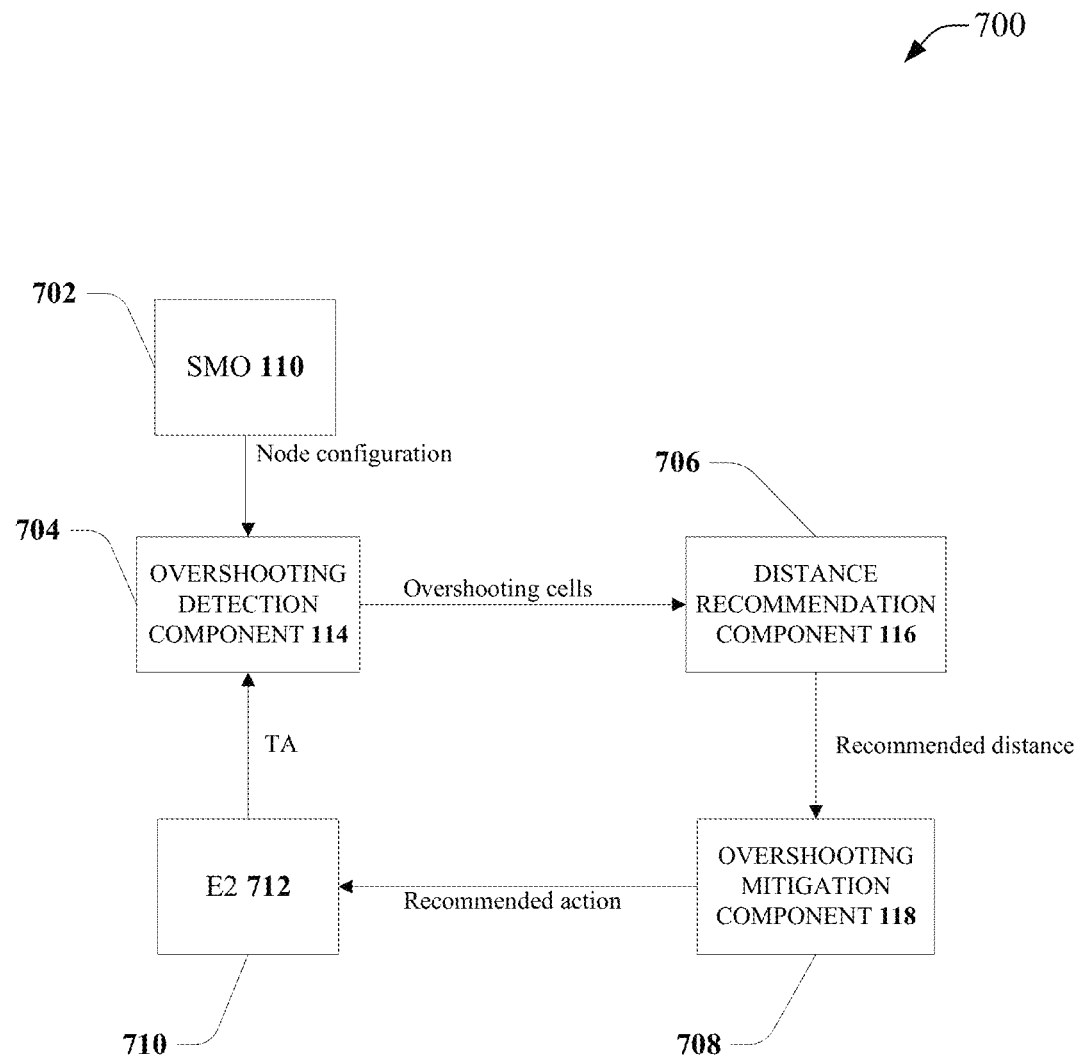
FIG. 7 is a flow chart for a process associated with overshooting mitigation in accordance with one or more embodiments described herein.

FIG. 7 illustrates a flow chart for a process 700 associated with overshooting mitigation in accordance with one or more embodiments described herein. At 702, the SMO 110 can perform node configuration (e.g., on an E2 node/cell), which can comprise a trigger to begin the process 700. At 704, the overshooting detection component 114 can detect overshooting cells (e.g., source cells herein). At 706, the distance recommendation component 116 can determine a recommended distance for the source cells. At 708, the overshooting mitigation component 118 can determine a recommended action to be applied to the source cell (e.g., an E2 node 712) at 710, after which the process 700 can return to 704.

Figure 8:
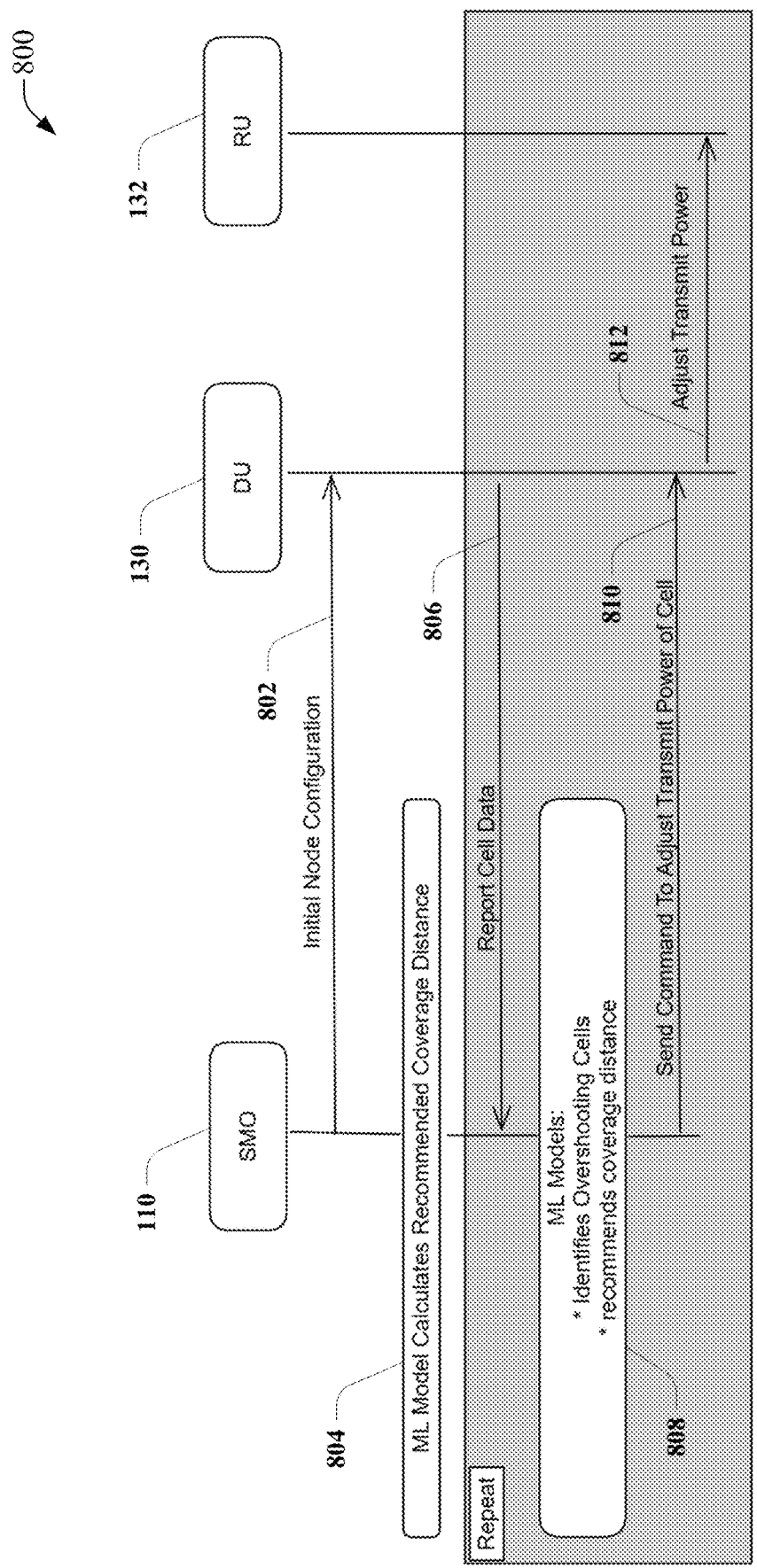
FIG. 8 is a flow chart for a process associated with overshooting mitigation in accordance with one or more embodiments described herein.

FIG. 8 illustrates a flow chart for a process 800 associated with overshooting mitigation in accordance with one or more embodiments described herein. At 802, the SMO 110 can perform initial node configuration. At 804, the distance recommendation component 116 can determine a recommend coverage distance applicable to a source cell herein. At 806, the DU 130 can report cell data to the SMO 110. At 808, one or more ML models (e.g., of the model(s) 122) can be utilized (e.g., via the SMO 110) in order to identify overshooting cells and/or recommend coverage distance. At 810, the SMO 110 can send an instruction to adjust a transmit power of the source cell (e.g., to the DU 130). At 812, the DU 130 can send an instruction to the RU 132 to adjust the transmit power of the source cell (e.g., source cell 202). It is noted that steps 806-812 can repeat until the recommended distance is reached, thus breaking the repeat loop.

Figure 9:
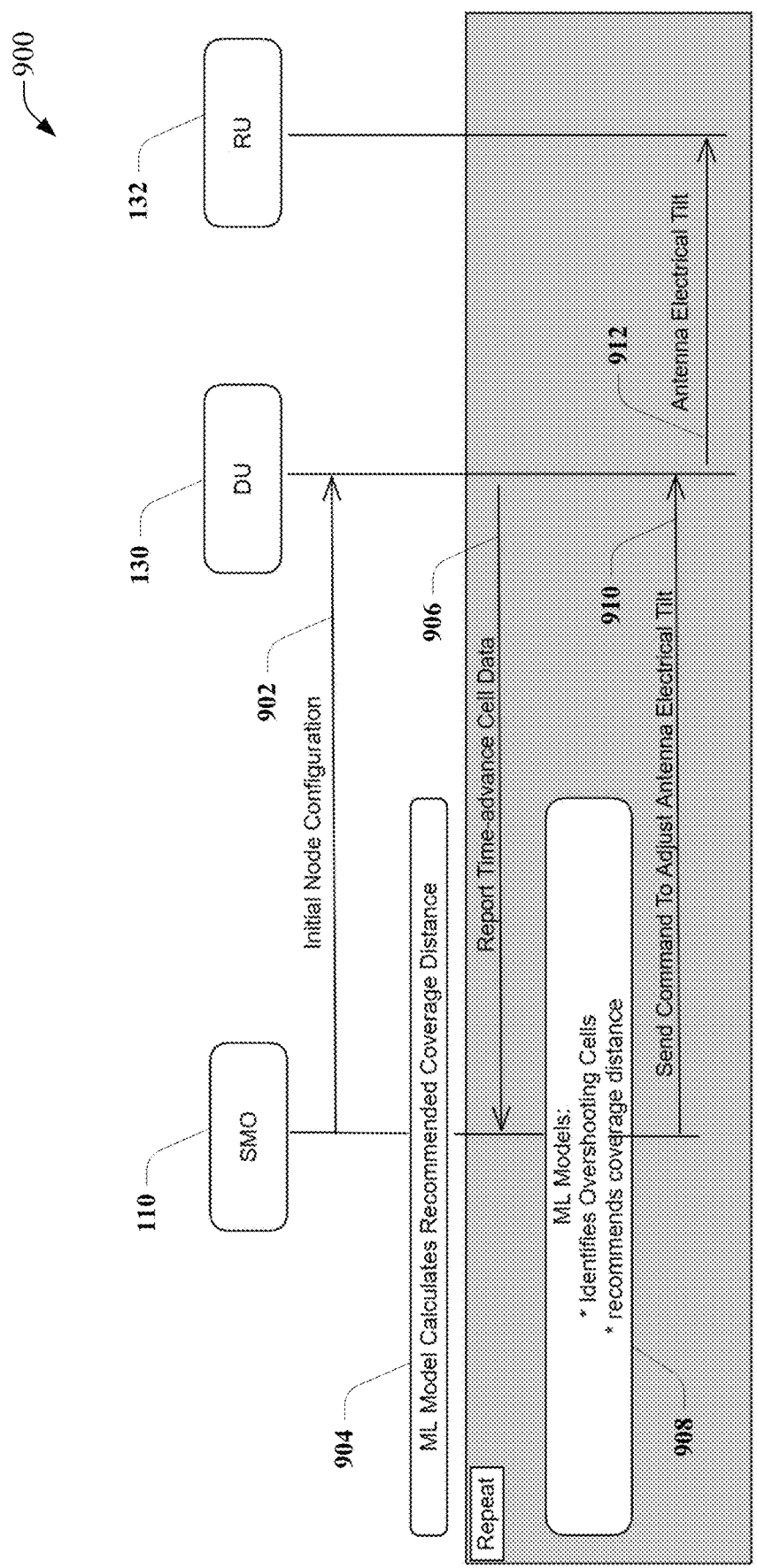
FIG. 9 is a flow chart for a process associated with overshooting mitigation in accordance with one or more embodiments described herein.

FIG. 9 illustrates a flow chart for a process 900 associated with overshooting mitigation in accordance with one or more embodiments described herein. At 902, the SMO 110 can perform initial node configuration. At 904, the distance recommendation component 116 can determine a recommend coverage distance applicable to a source cell herein. At 906, the DU 130 can report time-advance cell data to the SMO 110. At 908, one or more ML models (e.g., of the model(s) 122) can be utilized (e.g., via the SMO 110) in order to identify overshooting cells and/or recommend coverage distance. At 910, the SMO 110 can send an instruction to adjust antenna electrical tilt of the source cell (e.g., to the DU 130). At 912, the DU 130 can send an instruction to the RU 132 to adjust the electrical tilt of the source cell (e.g., source cell 202). It is noted that steps 906-912 can repeat until the recommended distance is reached, thus breaking the repeat loop.

Figure 10:
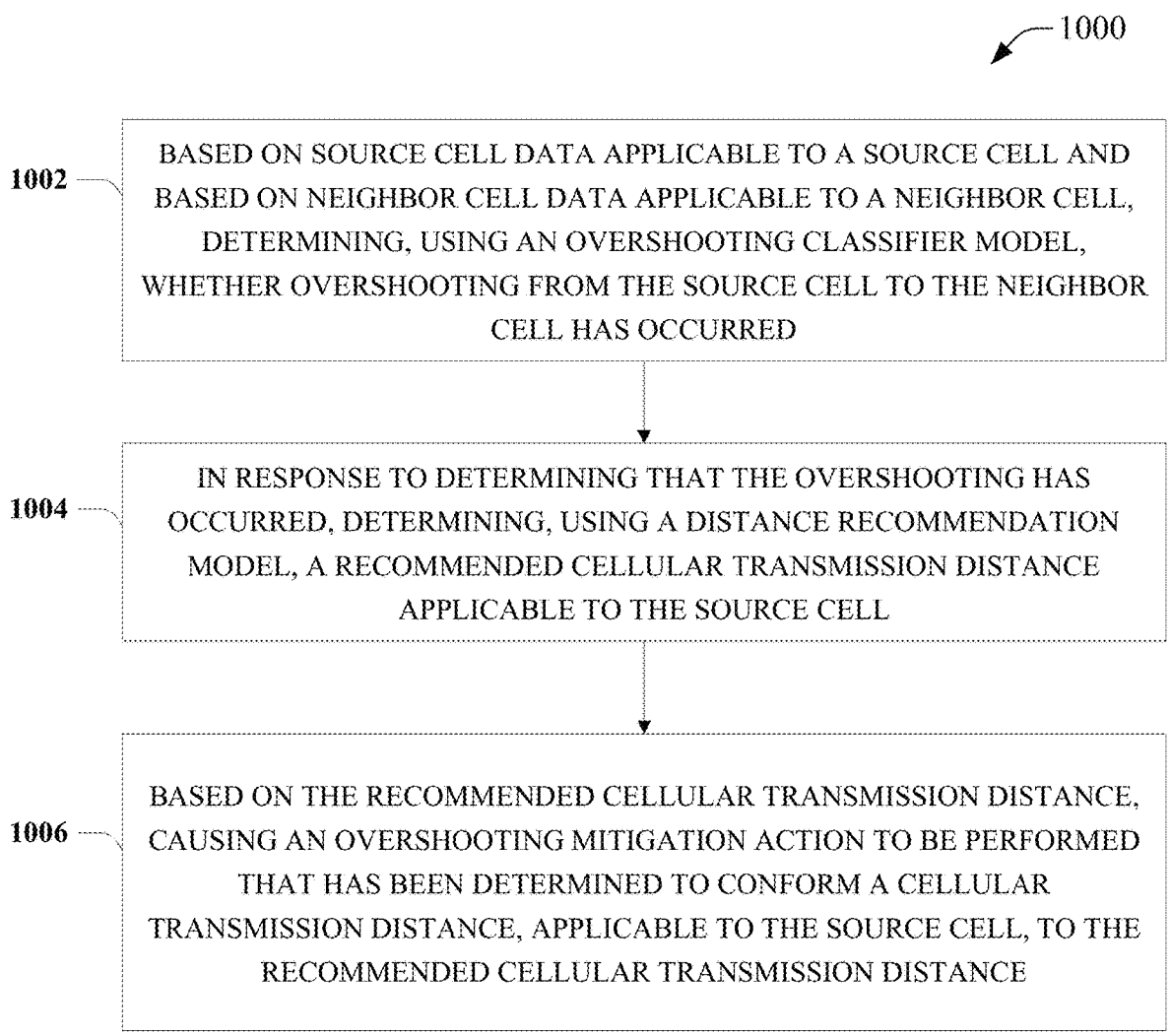
FIG. 10 is a block flow diagram for a process associated with overshooting mitigation in accordance with one or more embodiments described herein.

FIG. 10 illustrates a block flow diagram for a process 1000 associated with overshooting mitigation in accordance with one or more embodiments described herein. At 1002, the process 1000 can comprise, based on source cell data applicable to a source cell (e.g., source cell 202) and based on neighbor cell data applicable to a neighbor cell (e.g., neighbor cell 208), determining (e.g., via the overshooting detection component 114), using an overshooting classifier model (e.g., of the model(s) 122), whether overshooting from the source cell (e.g., source cell 202) to the neighbor cell (e.g., neighbor cell 208) has occurred. At 1004, the process 1000 can comprise, in response to determining that the overshooting has occurred, determining (e.g., via the distance recommendation component 116), using a distance recommendation model (e.g., of the model(s) 122), a recommended cellular transmission distance applicable to the source cell (e.g., source cell 202). At 1006, the process 1000 can comprise, based on the recommended cellular transmission distance, causing (e.g., via the overshooting mitigation component 118) an overshooting mitigation action to be performed that has been determined (e.g., via the overshooting mitigation component 118) to conform a cellular transmission distance, applicable to the source cell (e.g., source cell 202), to the recommended cellular transmission distance.

Figure 11:
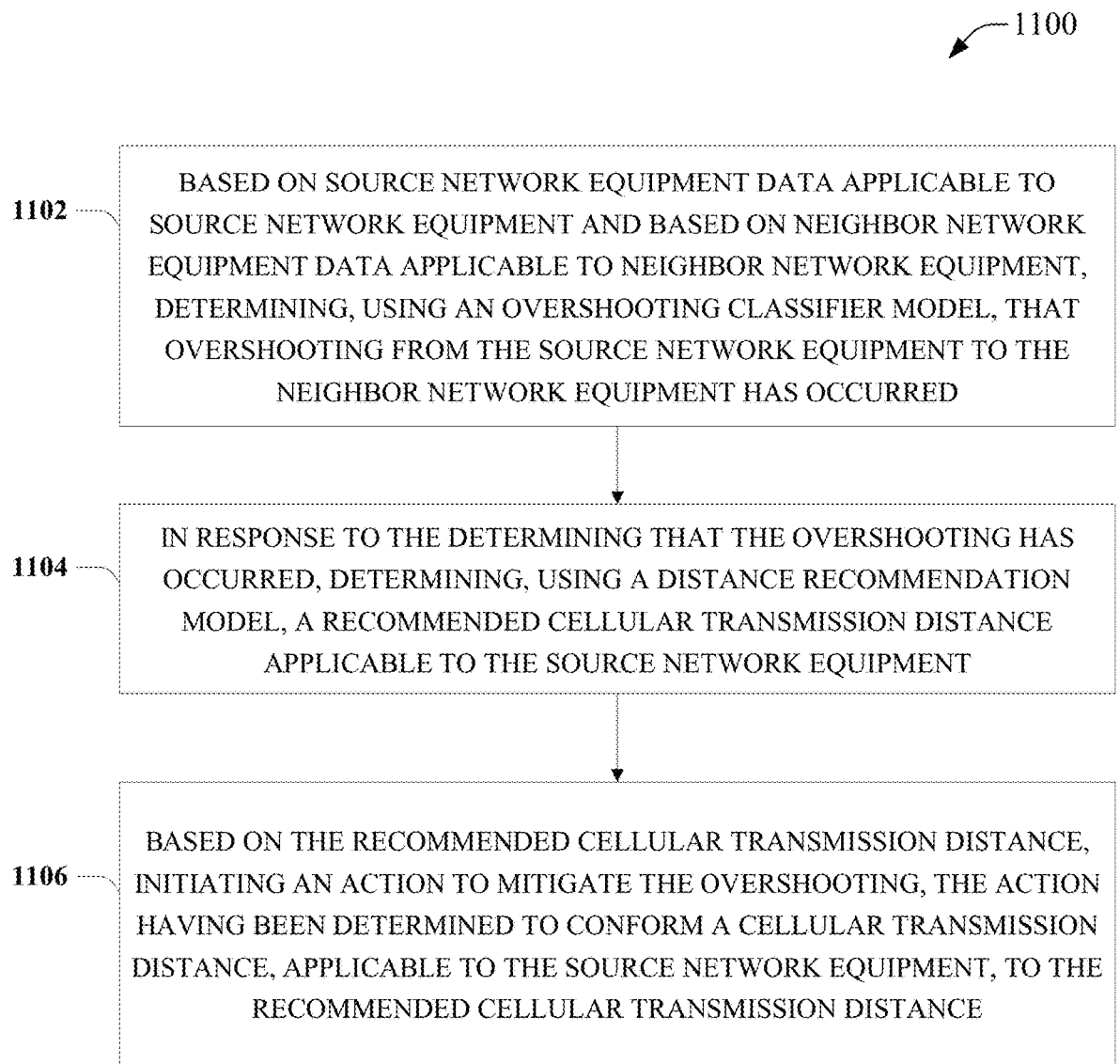
FIG. 11 is a block flow diagram for a process associated with overshooting mitigation in accordance with one or more embodiments described herein.

FIG. 11 illustrates a block flow diagram for a process 1100 associated with overshooting mitigation in accordance with one or more embodiments described herein. At 1102, the process 1100 can comprise, based on source network equipment data applicable to source network equipment (e.g., source cell 202) and based on neighbor network equipment data applicable to neighbor network equipment (e.g., neighbor cell 208), determining (e.g., via the overshooting detection component 114), using an overshooting classifier model (e.g., of the model(s) 122), that overshooting from the source network equipment (e.g., source cell 202) to the neighbor network equipment (e.g., neighbor cell 208) has occurred. At 1104, the process 1100 can comprise, in response to the determining that the overshooting has occurred, determining (e.g., via the distance recommendation component 116), using a distance recommendation model (e.g., of the model(s) 122), a recommended cellular transmission distance applicable to the source network equipment (e.g., source cell 202). At 1106, the process 1100 can comprise, based on the recommended cellular transmission distance, initiating (e.g., via the overshooting mitigation component 118) an action to mitigate the overshooting, the action having been determined (e.g., via the overshooting mitigation component 118) to conform a cellular transmission distance, applicable to the source network equipment (e.g., source cell 202), to the recommended cellular transmission distance.

Figure 12:
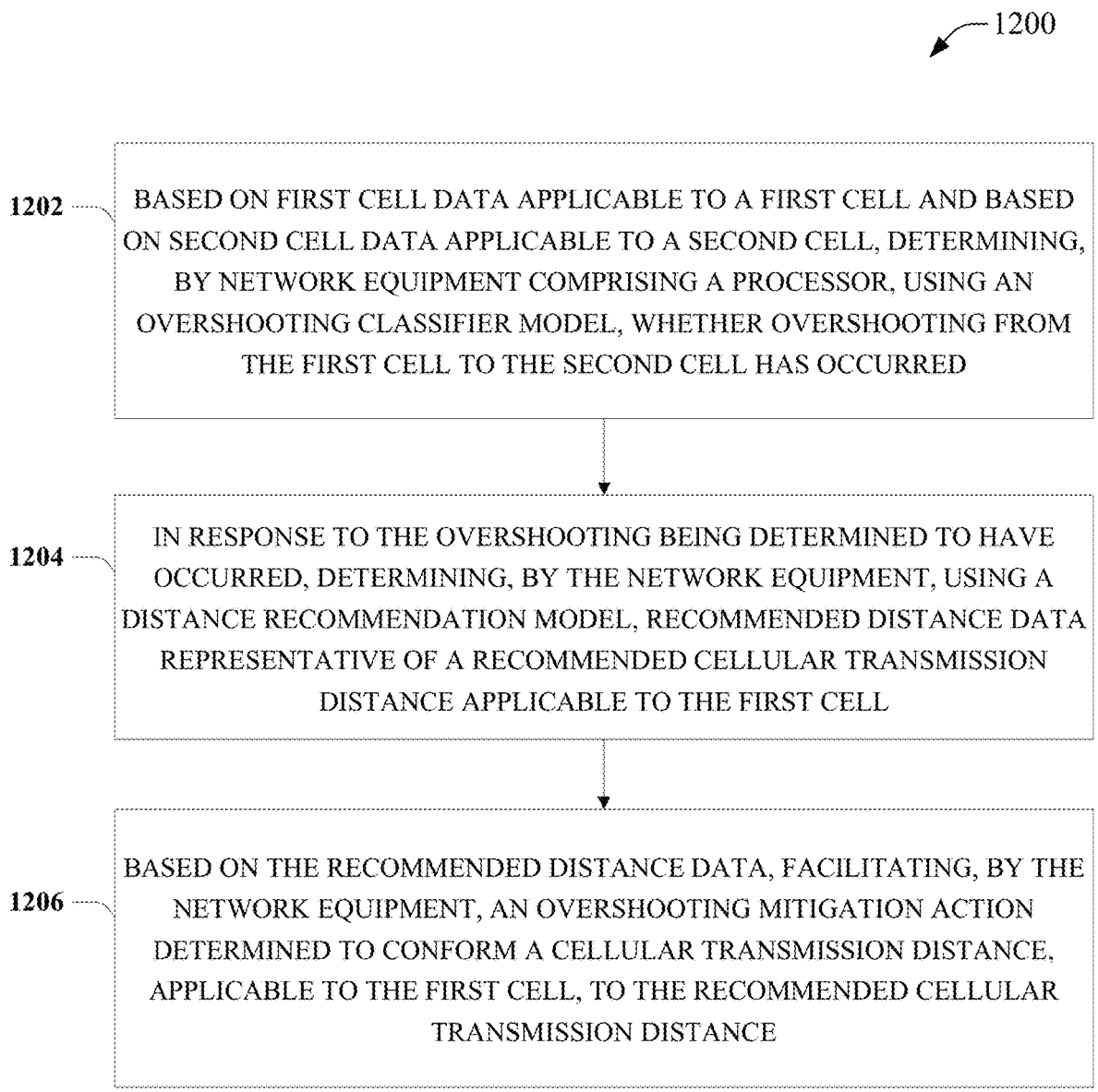
FIG. 12 is a block flow diagram for a process associated with overshooting mitigation in accordance with one or more embodiments described herein.

FIG. 12 illustrates a block flow diagram for a process 1200 associated with overshooting mitigation in accordance with one or more embodiments described herein. At 1202, the process 1200 can comprise, based on first cell data applicable to a first cell (e.g., source cell 202) and based on second cell data applicable to a second cell (e.g., neighbor cell 208), determining, by network equipment comprising a processor (e.g., via the overshooting detection component 114), using an overshooting classifier model (e.g., of the model(s) 122), whether overshooting from the first cell (e.g., source cell 202) to the second cell (e.g., neighbor cell 208) has occurred. At 1204, the process 1200 can comprise, in response to the overshooting being determined to have occurred, determining, by the network equipment (e.g., via the distance recommendation component 116), using a distance recommendation model (e.g., of the model(s) 122), recommended distance data representative of a recommended cellular transmission distance applicable to the first cell (e.g., source cell 202). At 1206, the process 1200 can comprise, based on the recommended distance data, facilitating, by the network equipment (e.g., via the overshooting mitigation component 118), an overshooting mitigation action determined (e.g., via the overshooting mitigation component 118) to conform a cellular transmission distance, applicable to the first cell (e.g., source cell 202), to the recommended cellular transmission distance.

Figure 13:
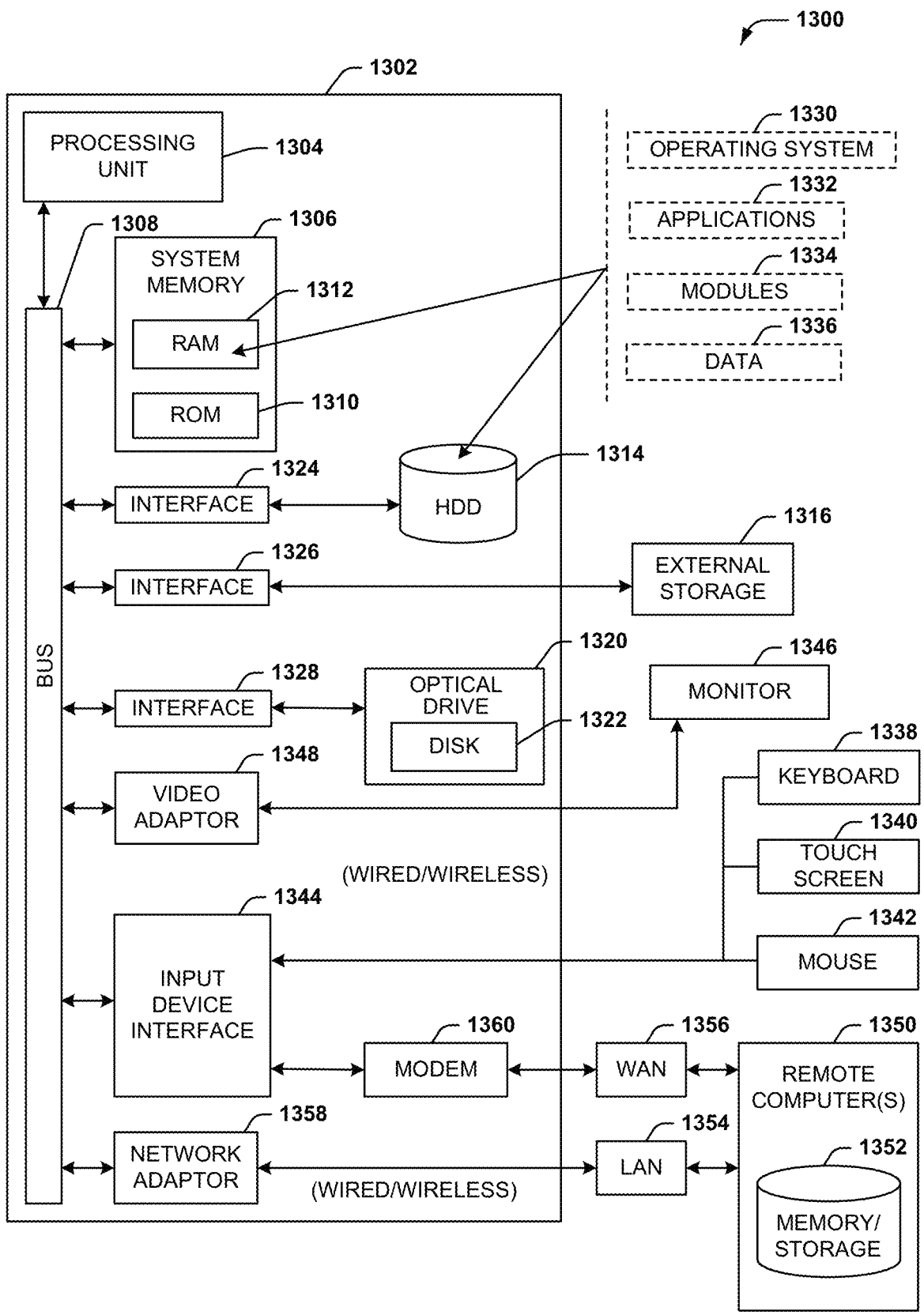
FIG. 13 is an example, non-limiting computing environment in which one or more embodiments described herein can be implemented.

In order to provide additional context for various embodiments described herein, FIG. 13 and the following discussion are intended to provide a brief, general description of a suitable computing environment 1300 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data, or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory, or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries, or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared, and other wireless media.

With reference again to FIG. 13, the example environment 1300 for implementing various embodiments of the aspects described herein includes a computer 1302, the computer 1302 including a processing unit 1304, a system memory 1306 and a system bus 1308. The system bus 1308 couples system components including, but not limited to, the system memory 1306 to the processing unit 1304. The processing unit 1304 can be any of various commercially available processors. Dual microprocessors and other multi-processor architectures can also be employed as the processing unit 1304.

The system bus 1308 can be any of several types of bus structure that can further interconnect to a memory bus (with or without a memory controller), a peripheral bus, and a local bus using any of a variety of commercially available bus architectures. The system memory 1306 includes ROM 1310 and RAM 1312. A basic input/output system (BIOS) can be stored in a non-volatile memory such as ROM, erasable programmable read only memory (EPROM), EEPROM, which BIOS contains the basic routines that help to transfer information between elements within the computer 1302, such as during startup. The RAM 1312 can also include a high-speed RAM such as static RAM for caching data.

The computer 1302 further includes an internal hard disk drive (HDD) 1314 (e.g., EIDE, SATA), one or more external storage devices 1316 (e.g., a magnetic floppy disk drive (FDD) 1316, a memory stick or flash drive reader, a memory card reader, etc.) and an optical disk drive 1320 (e.g., which can read or write from a disk 1322 such as CD-ROM disc, a DVD, a BD, etc.). While the internal HDD 1314 is illustrated as located within the computer 1302, the internal HDD 1314 can also be configured for external use in a suitable chassis (not shown). Additionally, while not shown in environment 1300, a solid-state drive (SSD) could be used in addition to, or in place of, an HDD 1314. The HDD 1314, external storage device(s) 1316 and optical disk drive 1320 can be connected to the system bus 1308 by an HDD interface 1324, an external storage interface 1326 and an optical drive interface 1328, respectively. The interface 1324 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1302, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1312, including an operating system 1330, one or more application programs 1332, other program modules 1334 and program data 1336. All or portions of the operating system, applications, modules, and/or data can also be cached in the RAM 1312. The systems and methods described herein can be implemented utilizing various commercially available operating systems or combinations of operating systems.

Computer 1302 can optionally comprise emulation technologies. For example, a hypervisor (not shown) or other intermediary can emulate a hardware environment for operating system 1330, and the emulated hardware can optionally be different from the hardware illustrated in FIG. 13. In such an embodiment, operating system 1330 can comprise one virtual machine (VM) of multiple VMs hosted at computer 1302. Furthermore, operating system 1330 can provide runtime environments, such as the Java runtime environment or the .NET framework, for applications 1332. Runtime environments are consistent execution environments that allow applications 1332 to run on any operating system that includes the runtime environment. Similarly, operating system 1330 can support containers, and applications 1332 can be in the form of containers, which are lightweight, standalone, executable packages of software that include, e.g., code, runtime, system tools, system libraries and settings for an application.

Further, computer 1302 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1302, e.g., applied at the application execution level or at the operating system (OS) kernel level, thereby enabling security at any level of code execution.

A user can enter commands and information into the computer 1302 through one or more wired/wireless input devices, e.g., a keyboard 1338, a touch screen 1340, and a pointing device, such as a mouse 1342. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1304 through an input device interface 1344 that can be coupled to the system bus 1308, but can be connected by other interfaces, such as a parallel port, an IEEE 1394 serial port, a game port, a USB port, an IR interface, a BLUETOOTH® interface, etc.

A monitor 1346 or other type of display device can be also connected to the system bus 1308 via an interface, such as a video adapter 1348. In addition to the monitor 1346, a computer typically includes other peripheral output devices (not shown), such as speakers, printers, etc.

The computer 1302 can operate in a networked environment using logical connections via wired and/or wireless communications to one or more remote computers, such as a remote computer(s) 1350. The remote computer(s) 1350 can be a workstation, a server computer, a router, a personal computer, portable computer, microprocessor-based entertainment appliance, a peer device or other common network node, and typically includes many or all of the elements described relative to the computer 1302, although, for purposes of brevity, only a memory/storage device 1352 is illustrated. The logical connections depicted include wired/wireless connectivity to a local area network (LAN) 1354 and/or larger networks, e.g., a wide area network (WAN) 1356. Such LAN and WAN networking environments are commonplace in offices and companies, and facilitate enterprise-wide computer networks, such as intranets, all of which can connect to a global communications network, e.g., the Internet.

When used in a LAN networking environment, the computer 1302 can be connected to the local network 1354 through a wired and/or wireless communication network interface or adapter 1358. The adapter 1358 can facilitate wired or wireless communication to the LAN 1354, which can also include a wireless access point (AP) disposed thereon for communicating with the adapter 1358 in a wireless mode.

When used in a WAN networking environment, the computer 1302 can include a modem 1360 or can be connected to a communications server on the WAN 1356 via other means for establishing communications over the WAN 1356, such as by way of the Internet. The modem 1360, which can be internal or external and a wired or wireless device, can be connected to the system bus 1308 via the input device interface 1344. In a networked environment, program modules depicted relative to the computer 1302 or portions thereof, can be stored in the remote memory/storage device 1352. It will be appreciated that the network connections shown are examples and other means of establishing a communications link between the computers can be used.

When used in either a LAN or WAN networking environment, the computer 1302 can access cloud storage systems or other network-based storage systems in addition to, or in place of, external storage devices 1316 as described above. Generally, a connection between the computer 1302 and a cloud storage system can be established over a LAN 1354 or WAN 1356 e.g., by the adapter 1358 or modem 1360, respectively. Upon connecting the computer 1302 to an associated cloud storage system, the external storage interface 1326 can, with the aid of the adapter 1358 and/or modem 1360, manage storage provided by the cloud storage system as it would other types of external storage. For instance, the external storage interface 1326 can be configured to provide access to cloud storage sources as if those sources were physically connected to the computer 1302.

The computer 1302 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 14:
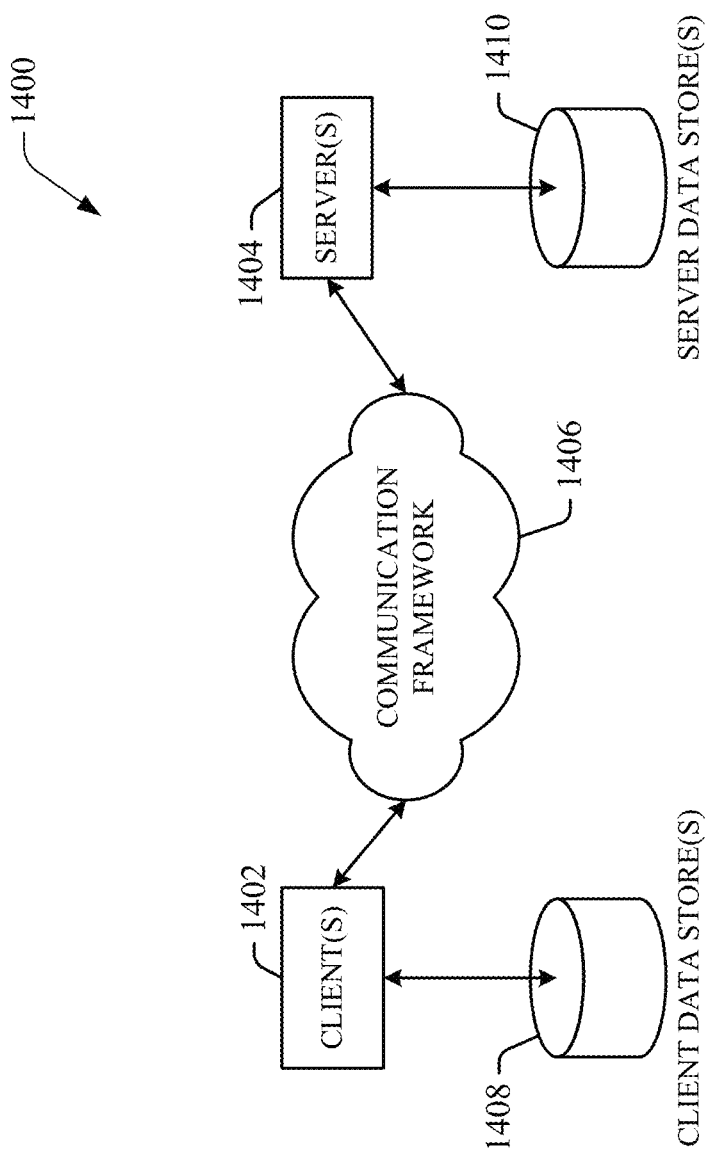
FIG. 14 is an example, non-limiting networking environment in which one or more embodiments described herein can be implemented.

Referring now to FIG. 14, there is illustrated a schematic block diagram of a computing environment 1400 in accordance with this specification. The system 1400 includes one or more client(s) 1402, (e.g., computers, smart phones, tablets, cameras, PDA's). The client(s) 1402 can be hardware and/or software (e.g., threads, processes, computing devices). The client(s) 1402 can house cookie(s) and/or associated contextual information by employing the specification, for example.

The system 1400 also includes one or more server(s) 1404. The server(s) 1404 can also be hardware or hardware in combination with software (e.g., threads, processes, computing devices). The servers 1404 can house threads to perform transformations of media items by employing aspects of this disclosure, for example. One possible communication between a client 1402 and a server 1404 can be in the form of a data packet adapted to be transmitted between two or more computer processes wherein data packets may include coded analyzed headspaces and/or input. The data packet can include a cookie and/or associated contextual information, for example. The system 1400 includes a communication framework 1406 (e.g., a global communication network such as the Internet) that can be employed to facilitate communications between the client(s) 1402 and the server(s) 1404.

Communications can be facilitated via a wired (including optical fiber) and/or wireless technology. The client(s) 1402 are operatively connected to one or more client data store(s) 1408 that can be employed to store information local to the client(s) 1402 (e.g., cookie(s) and/or associated contextual information). Similarly, the server(s) 1404 are operatively connected to one or more server data store(s) 1410 that can be employed to store information local to the servers 1404.

In one exemplary embodiment, a client 1402 can transfer an encoded file, (e.g., encoded media item), to server 1404. Server 1404 can store the file, decode the file, or transmit the file to another client 1402. It is noted that a client 1402 can also transfer an uncompressed file to a server 1404 and server 1404 can compress the file and/or transform the file in accordance with this disclosure. Likewise, server 1404 can encode information and transmit the information via communication framework 1406 to one or more clients 1402.

The illustrated aspects of the disclosure may also be practiced in distributed computing environments where certain tasks are performed by remote processing devices that are linked through a communications network. In a distributed computing environment, program modules can be located in both local and remote memory storage devices.

The above description includes non-limiting examples of the various embodiments. It is, of course, not possible to describe every conceivable combination of components or methods for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above-described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word-without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A system, comprising:
   at least one processor; and
   at least one memory that stores executable instructions that, when executed by the at least one processor, facilitate performance of operations, comprising:
   based on source cell data applicable to a source cell and based on neighbor cell data applicable to a neighbor cell, determining, using an overshooting classifier model, whether overshooting from the source cell to the neighbor cell has occurred;
   in response to determining that the overshooting has occurred, determining, using a distance recommendation model, a recommended cellular transmission distance applicable to the source cell; and
   based on the recommended cellular transmission distance, causing an overshooting mitigation action to be performed that has been determined to conform a cellular transmission distance, applicable to the source cell, to the recommended cellular transmission distance,
   wherein the operations are iteratively performed, and wherein iterations are minimized using an Okumura-Hata model to predict propagation pathloss for the recommended cellular transmission distance.

2. The system of claim 1, wherein the overshooting classifier model was generated using machine learning based on past overshooting between other cells, other than the source cell and the neighbor cell.

3. The system of claim 1, wherein the distance recommendation model was generated using machine learning based on past distances of other cellular transmissions of other cells, other than the source cell.

4. The system of claim 1, wherein the overshooting mitigation action comprises a change in transmission power applicable to the source cell.

5. The system of claim 1, wherein the overshooting mitigation action comprises a change in a tilt of an antenna applicable to the source cell.

6. The system of claim 1, wherein the source cell data or the neighbor cell data comprise time advance data, geographical location data, azimuth data, antenna height data, transmission power data, radio frequency data, antenna tilt data, antenna gain data, or terrain type data applicable to the source cell or to the neighbor cell.

7. The system of claim 1, wherein the neighbor cell comprises a first neighbor cell, and wherein the recommended cellular transmission distance is based on overshooting of the source cell to the first neighbor cell and overshooting of the source cell to a second neighbor cell, other than the first neighbor cell.

8. The system of claim 1, wherein the overshooting mitigation action is determined using an overshooting mitigation model, and wherein the overshooting mitigation model was generated using machine learning based on past overshooting mitigation actions, other than the overshooting mitigation action.

9. The system of claim 1, wherein the operations further comprise:
   in response to causing the overshooting mitigation action, determining, using the overshooting classifier model, whether the overshooting from the source cell to the neighbor cell has stopped occurring.

10. The system of claim 9, wherein the operations further comprise:
    in response to a result of the determining whether the overshooting has stopped occurring indicating that the overshooting from the source cell to the neighbor cell has not stopped occurring, determining, using the distance recommendation model, a revised recommended cellular transmission distance applicable to the source cell; and
    based on the revised recommended cellular transmission distance, causing a revised overshooting mitigation action to be performed that has been determined to conform the cellular transmission distance to the revised recommended cellular transmission distance.

11. A non-transitory machine-readable medium, comprising executable instructions that, when executed by at least one processor, facilitate performance of operations, comprising:
    based on source network equipment data applicable to source network equipment and based on neighbor network equipment data applicable to neighbor network equipment, determining, using an overshooting classifier model, that overshooting from the source network equipment to the neighbor network equipment has occurred;
    in response to the determining that the overshooting has occurred, determining, using a distance recommendation model, a recommended cellular transmission distance applicable to the source network equipment; and
    based on the recommended cellular transmission distance, initiating an action to mitigate the overshooting, the action having been determined to conform a cellular transmission distance, applicable to the source network equipment, to the recommended cellular transmission distance,
    wherein the operations are iteratively performed, and wherein iterations are minimized using an Okumura-Hata model to predict propagation pathloss for the recommended cellular transmission distance.

12. The non-transitory machine-readable medium of claim 11, wherein the overshooting classifier model was generated using machine learning based on past overshooting between other network equipment, other than the source network equipment and the neighbor network equipment.

13. The non-transitory machine-readable medium of claim 11, wherein the distance recommendation model was generated using machine learning based on past distances of other cellular transmissions of other network equipment, other than the source network equipment.

14. The non-transitory machine-readable medium of claim 11, wherein the action comprises a change in transmission power applicable to the source network equipment.

15. The non-transitory machine-readable medium of claim 11, wherein the action comprises a change in a tilt of an antenna applicable to the source network equipment.

16. A method, comprising:
    based on first cell data applicable to a first cell and based on second cell data applicable to a second cell, determining, by network equipment comprising at least one processor, using an overshooting classifier model, whether overshooting from the first cell to the second cell has occurred;

in response to the overshooting being determined to have occurred, determining, by the network equipment, using a distance recommendation model, recommended distance data representative of a recommended cellular transmission distance applicable to the first cell; and based on the recommended distance data, facilitating, by the network equipment, an overshooting mitigation action determined to conform a cellular transmission distance, applicable to the first cell, to the recommended cellular transmission distance, wherein the method is iteratively performed, and wherein iterations are minimized using an Okumura-Hata model to predict propagation pathloss for the recommended cellular transmission distance.

17. The method of claim 16, wherein the first cell data or the second cell data comprise time advance data, geographical location data, azimuth data, antenna height data, transmission power data, radio frequency data, antenna tilt data, antenna gain data, or terrain type data applicable to the first cell or to the second cell.

18. The method of claim 16, wherein the recommended cellular transmission distance is based on a first overshooting of the first cell to the second cell and a second overshooting of the first cell to a third cell, other than the first cell and the second cell.

19. The method of claim 16, wherein the overshooting mitigation action is determined using an overshooting mitigation model, and wherein the overshooting mitigation model was generated using machine learning based on past overshooting mitigation actions, other than the overshooting mitigation action.

20. The method of claim 16, further comprising:

in response to facilitating the overshooting mitigation action, determining, by the network equipment, using the overshooting classifier model, whether the overshooting from the first cell to the second cell has stopped occurring;

in response to a determination that the overshooting from the first cell to the second cell has not stopped occurring, determining, by the network equipment, using the distance recommendation model, revised recommended distance data representative of a revised recommended cellular transmission distance applicable to the first cell; and based on the revised recommended distance data, facilitating, by the network equipment, a revised overshooting mitigation action determined to conform the cellular transmission distance to the revised recommended cellular transmission distance.

* * * * *